Sept. 10, 1935.　　　　G. WAGNER　　　　2,013,933
MACHINE FOR INSERTING AND REMOVING BOILER TUBES
Filed Dec. 26, 1933
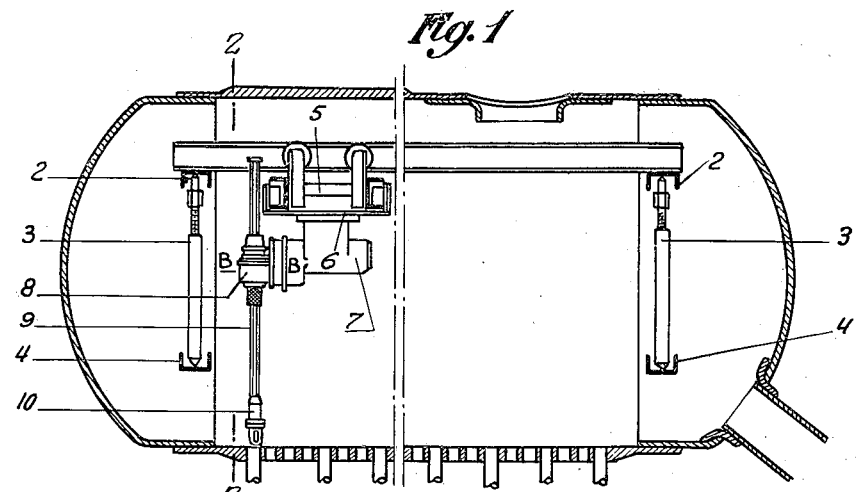
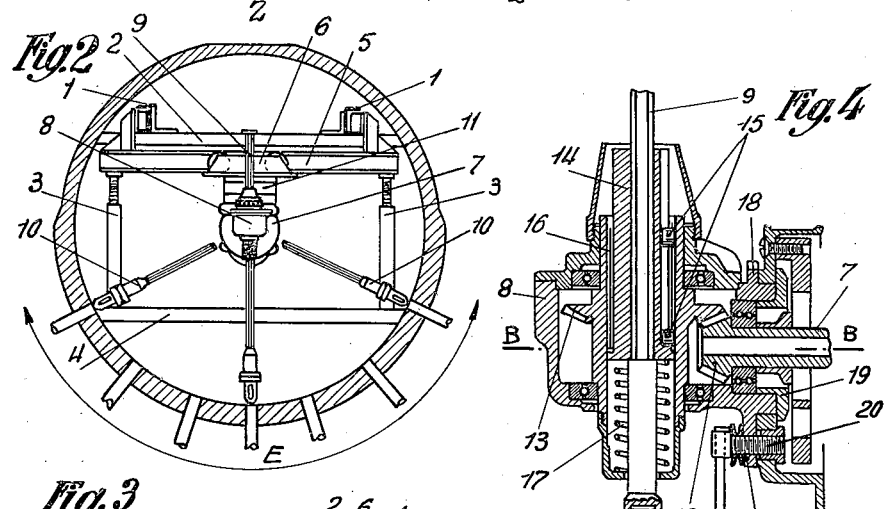
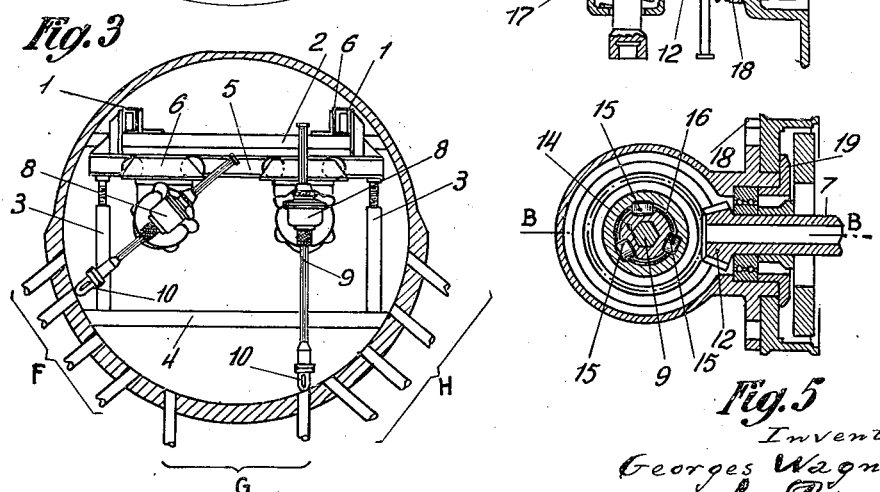
Inventor:
Georges Wagner Patented Sept. 10, 1935

2,013,933

UNITED STATES PATENT OFFICE 2,013,933

MACHINE FOR INSERTING AND REMOVING BOILER TUBES

Georges Wagner, St.-Etienne, France

Application December 26, 1933, Serial No. 704,000
In France September 14, 1933

2 Claims. (Cl. 153—81)

Multi-tubular boilers are more and more used in land and marine installations, for they present considerable advantages over other types both from the point of view of the smaller space which they take up as also of their vaporizing power.

Such boilers often comprise several thousand tubes which are expanded in the holes made in the surfaces of the water and steam drums and collectors. This expanding must be carried out with great regularity and represents long and delicate work.

Hitherto, the expanding has been carried out by manually supporting the whole or a part of the weight of the expanding members in operation and the reaction force during operation.

Such methods only give a very limited output and they are furthermore tiring and often dangerous.

Furthermore, the expanders not being suitably directed cannot always be relied upon to give perfectly tight joints.

The object of the present invention is to provide a machine permitting the operators to direct the expanders in a perfect manner and to work with great rapidity, complete safety and very easily.

This machine comprises essentially a carriage movable in the direction of the length of the boiler and carrying a motor which drives through the intermediary of a movable head, the spindle of the tool.

In the annexed drawing there is shown as an example one method of carrying out the invention.

Figure 1 is a longitudinal sectional view of an upper boiler drum;

Figure 2 is a sectional view on the line 2—2 of the same drum, for a case in which the boiler tubes have their ends directed radially.

Figure 3 is a view similar to Fig. 2 showing the device in use in connection with a different type of drum.

Figure 4 is a section on a vertical plane passing through the axis B—B, in the head of the motor of the machine.

Figure 5 is a section through the same part in a horizontal plane passing through the axis B—B.

A frame made of rolled section iron bars 1, 1 (if necessary constructed for dismantling into several parts for allowing insertion through the man-holes) connected by end pieces 2, 2 is held clamped against the inner wall of the drum opposite the group of tubes, by adjustable screw jacks 3, 3 having their point of support on bearers 4, 4 themselves resting on the inner wall of the drum.

A longitudinal carriage 5 provided with rollers is arranged for movement on this frame in the direction of the length of the drum.

The longitudinal carriage 5 supports a transverse carriage 6 provided with rollers and adapted to be moved in the direction of the width of the drum.

On this transverse carriage 6 is fixed the motor 7, the head 8 of which may be turned about the axis B—B.

Inside the head 8 is provided a sliding prismatic or splined spindle 9 driven by the motor 7 and which takes at its end the expander 10.

The operation of the machine is as follows:

1. *In cases where the boilers have the extremities of the tubes all directed radially (Figure 2)*

The transverse carriage 6 will be fixed on the longitudinal carriage 5 in a position such that the axis B—B about which the head 8 turns is in a vertical plane passing through the axis of the drum. Either by construction or due to the presence of a suitable packing block 11, the axis B—B is made to coincide with that of the drum. The head 8 can rotate freely about the axis B—B.

The operator directs the expander 10 in front of the tube to be expanded and then introduces it into the tube and starts the motor to carry out the work.

After having disengaged the expander, he can insert it in another tube of the same longitudinal row by shifting the longitudinal carriage 5, or into another tube of the same transverse set by causing the head 8 to pivot about the axis B—B over the whole angle E.

It will be understood that the whole group of tubes may be expanded correctly and without undue fatigue to the operator.

It should be noted that in the case under consideration, the movement of the transverse carriage is not necessary. The motor 7 might therefore be fixed directly to the longitudinal carriage 5.

2. *Cases where boilers have tubes arranged in groups, the extremities of the tubes of the same group being all parallel—(Figure 3)*

Each of the three groups of tubes F, G and H is constituted by a certain number of tubes, the extremities of which are parallel.

To expand the tubes of the group F, the head 8 is turned and fixed in the direction of the extremities of the tubes of this group.

By shifting the transverse carriage 6 and sliding the spindle 9 carrying the expander, all the tubes of the same group may be dealt with.

The shifting of the longitudinal carriage 5 permits of access to the tubes of this group over the whole length of the drum.

The same procedure is adopted for the groups G and H, and in this case again the work is carried out under the best conditions of direction of the expander and without the operator having to support the least reactive stress.

The machine described is consequently quite universal and may be employed not only to expand the tubes but also to cut them out in case of replacement and remove the parts of the tubes fitted in the holes by substituting for the expander either a tube cutter or tube extractor.

Figures 4 and 5 show one of the constructional arrangements which may be adopted for the head 8.

The motor 7, which may be electric, compressed air, or of any other type, operates through two bevel wheels 12 and 13 a sleeve 14, sliding on rollers 15 inside the hub of the wheel 13 and having a greater travel than that of the spindle of the expander in its working period. The rollers 15 are held in a cage 16 which serves to keep them always in a proper position.

The splined or prismatic shaft 9 carrying the tool can move inside the sleeve 14.

A spring 17 returns the sleeve 14 into its top position after each working period.

The parts of the head are enclosed in a case 8 having a flange 18.

A counter flange 19 and screws 20 permit of directing the head and fixing it in any desired position.

The movement of the shaft 9 inside the sleeve 14 is made at the moment of the introduction of the expander into a tube and before the motor is started.

In the course of an expanding operation, the resisting couple increases progressively, attaining a very high value at the end of the operation. The shaft 9 which must move forward with the expander pin could only do this with a very considerable effort due to the sliding friction if it slid directly in the hub of the wheel 13.

The presence of the sleeve 14 moving with rolling friction inside the hub of the wheel 13 gives to the forward movement of the shaft 9 the necessary sensitiveness for correctly carrying out the expanding operation.

In both forms of my invention the sliding of the flanging or beading head up to the work is done manually.

It is evident that the use of this machine in the bottom drums of boilers could be carried out without difficulty.

I claim:

1. A machine for inserting and removing tubes of water tube boilers, comprising a frame adapted to be fixed in the interior of a drum, longitudinal rails carried by said frame, a carriage movable on said rails, a pair of transverse rails mounted on said movable carriage, a second carriage movable on the transverse rails, a motor carried by the second carriage, a tool-carrying head rotatably supported by said carriage, and means connecting the head with the motor.

2. A machine for inserting and removing tubes in a water tube boiler, comprising a frame adapted to be fixed in the interior of a drum of the boiler, longitudinal rails supported by said frame, a movable carriage mounted on said rails, transverse rails supported by said carriage, a second carriage mounted on said transverse rails, a motor supported by said second carriage, a tool, a head for carrying said tool rotatably supported on said second carriage, means for connecting said head to said motor, the rotatable head comprising a wheel driven by the motor, a sleeve slidably mounted axially of said wheel, rollers for reducing sliding friction between said sleeve and wheel, and a shaft to which the tool is fixed sliding with friction in said sleeve.

GEORGES WAGNER.